Masten & Van Vlack.
Bee Hive.
Nº 86,023.      Patented Jan. 19, 1869.
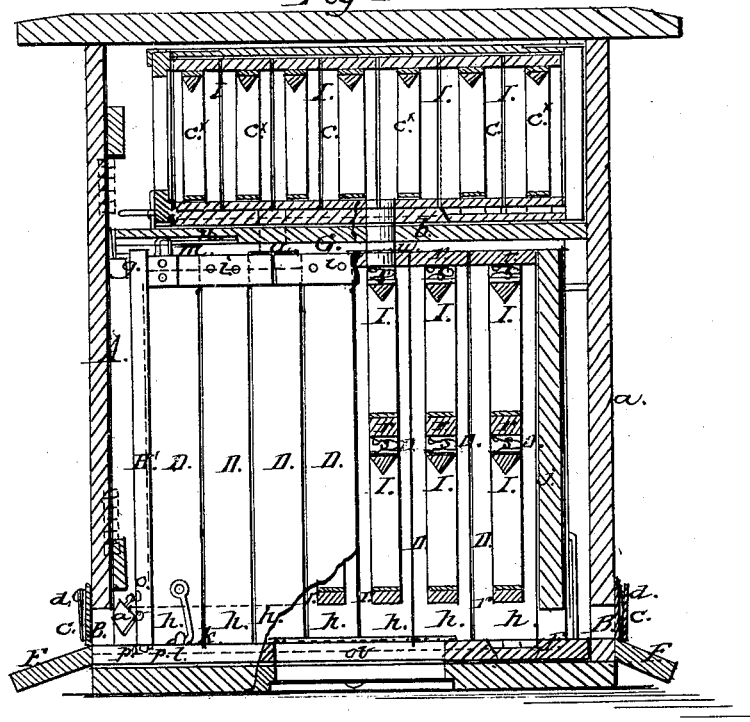
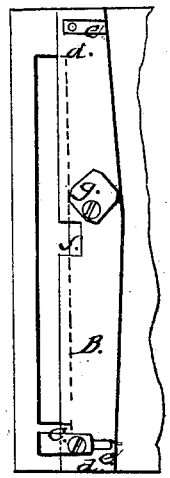
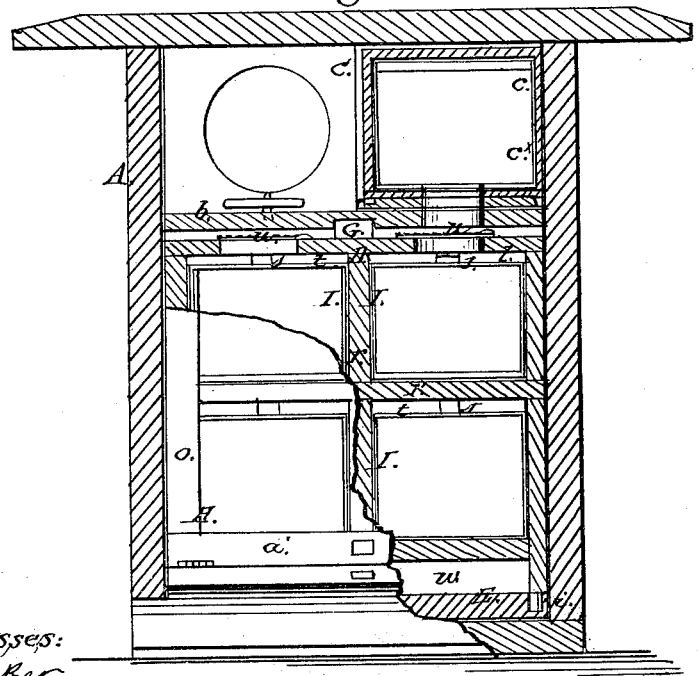
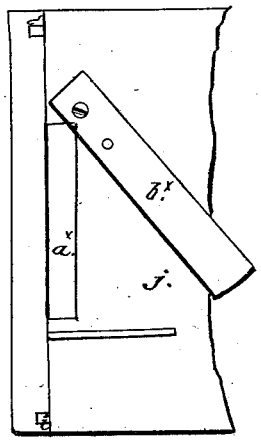
Witnesses:
Joh. Becker.
Wm. A. Morgan.
Inventors:
C.R.C. Masten
A.D. Van Vlack
Per Munn & Co
Attorneys

United States Patent Office.

CALVIN R. C. MASTEN AND ABRAM D. VAN VLACK, OF PLEASANT VALLEY, NEW YORK.

Letters Patent No. 86,023, dated January 19, 1869.

IMPROVEMENT IN BEE-HIVES.

The Schedule referred to in these Letters Patent and making part of the same.

*To all whom it may concern:*

Be it known that we, CALVIN R. C. MASTEN and ABRAM D. VAN VLACK, of Pleasant Valley, in the county of Dutchess, and State of New York, have invented a new and improved Bee-Hive; and we do hereby declare that the following is a full, clear, and exact description thereof, which will enable those skilled in the art to make and use the same, reference being had to the accompanying drawings, forming part of this specification.

This invention relates to a new and improved beehive, which consists in a novel construction and arrangement of the same, as hereinafter fully shown and described, whereby all the combs in the hive are rendered accessible, due provision made for ventilating, feeding, cleaning, &c., and a ready passage allowed the bees through the hive, from one comb to another, and the withdrawal or extraction with facility of the filled combs from the hive, and the insertion of empty ones in their place.

In the accompanying sheet of drawings—

Figure 1 is a side sectional elevation of our invention, the side of the hive being removed, and a portion of the comb-racks broken away.

Figure 2, a front sectional elevation of the same, the front being removed and a portion of the observation-glass broken away.

Figure 3, a detached view of one of the bee-entrances to the hive.

Figure 4, a detached view of the rear bee-entrance to the comb-frames.

Similar letters of reference indicate corresponding parts.

A represents the external case of the hive, which may be of rectangular form, and of any proper or convenient size.

This case, A, is provided with a hinged door, a, at its front, and has a horizontal partition, b, within it, on which the spare-honey boxes c rest, the partition b, being considerably above the centre of the case A.

The lower edge of the door a of the hive is notched out, or has a recess cut in it, and a similar recess, or a series of openings, is made in the lower part of the rear side of the hive.

These recesses serve as bee-entrances to the hive, and they are covered each by a slide, B, secured in position by spring-clamps C. (See, more particularly, fig. 1.)

These clamps are attached to the hive by bolts d, which pass through oblong slots e in the slides, (see fig. 3,) the pressure of the clamps against the slides causing the latter to be retained at any desired height within the scope of their movement, so that the bee-entrances may be varied in capacity, or be fully closed, as desired.

Each slide, B, has an opening, f, made in it, which may be covered or closed, when necessary, by a pivoted plate, g.

These openings serve as ventilators in winter.

D represents a series of rectangular or square frames, the lower ends of the side-pieces h of which are fitted in rebates i, in a base, E, a rebate being at each side of the upper surface of the base.

These frames are adjusted in close contact with each other, and are held in position by an upright back plate, j, attached to the rear of the base, E, and the foremost frame D, which has a hook, k, at each side, to catch into a staple, l, at the sides of the base. (See fig. 1.)

At the top of the side-pieces h, of every alternate frame, there are attached metal strips i', between which the upper ends of the side-pieces of the intermediate frames are fitted.

By this arrangement the series of frames D forms, when adjusted together in close contact, a close box secured to the base, E, which, with the frames D, may be readily inserted in the case A, and withdrawn therefrom.

The ends of the base, E, are provided with an alighting-board, F, and a bar, G, is hinged to the upper edge of the back plate j, through which bar a staple, m, in the top of the front frame D, passes, a hook, n, on bar G, passing through the staple, to hold the bar in position, and firmly secure the frames in contact.

In front of the front frame D there is placed a frame, H, provided with a glass.

The lower edges of the side-pieces o of this frame are formed with tenons to fit between pins p in the rebates in the base, and the front end of the bar G has a metal lip, q, attached to catch over the top of frame H, the latter being thereby secured in position.

Each frame D is divided by cross-bars r into four openings, in each of which a comb-frame, I, is fitted.

These comb-frames are constructed of splints, bent in quadrangular form, and secured in the openings by springs s, shown clearly in fig. 1.

By this arrangement the comb-frames may be secured in position, and readily removed, when desired; and the frames I may also be slightly adjusted in an inclined position, so that unsealed cells may be rendered available as feed-cups, a slight inclination of the comb-frames admitting of the cells holding a small quantity of sweetened water, or other material on which bees will subsist.

Ample spaces, t, are allowed over the comb-frames I, to admit of the bees passing from one end of the hive to the other, and ventilating-openings, covered with wire cloth or perforated metal plates u, are at the top and bottom of the frames D.

A ventilating-opening, v, is also made through the centre of the base, E, and through the bottom of the case A, as shown in fig. 1.

The space w, underneath the frames D, serves as an under passage for the bees, and the lower edge of the frame H is provided with a door or flap, $a'$, to close said passage when necessary.

The back-plate $j$ has an opening, $a^\times$, made in it, covered by a pivoted door or flap, $b^\times$, as shown in fig. 4, to admit of the bees entering the rear side of the frames D.

The spare-honey boxes $c$ are constructed and arranged on the same principle as the box of frames D, said boxes, $c$, being comprised of a series of frames, I, provided with removable splint comb-frames $c^\times$.

This invention affords superior facilities for hiving bees, for all that is required is to remove the box of frames D, open the door or flap $b^\times$, and the bees will enter, the door or flap being closed when the bees are all in, or hived.

We claim as new, and desire to secure by Letters Patent—

1. The frames D, divided by cross-bars $r$ into four openings, in combination with the detachable or removable splint-frames I, when the latter are fitted in said openings, and secured therein by springs $s$, substantially as shown and described.

2. The clamping or securing of the frames D, in contact on a removable base, E, by means of the hinged bar G, the fitting of the lower ends of the side-pieces $h\ h$ of said frames in rebates in the base, the back plate $j$, and hooks, or other suitable fastenings to secure the front frame to the base, all arranged substantially as and for the purpose set forth.

3. The clamps C, constructed and applied to the slide B, at the exterior of the case A of the hive, to admit of the ready variation of the capacity of the bee-entrances, substantially as set forth.

The above specification of our invention signed by us, this 3d day of September, 1868.

CALVIN R. C. MASTEN.
ABRAM D. VAN VLACK.

Witnesses:
FRANK BLOCKLEY,
A. V. BRIESEN.